United States Patent [19]
Hosaka

[11] 3,950,787
[45] Apr. 13, 1976

[54] CASSETTE HOLDING DEVICE FOR TAPE RECORDING AND/OR REPRODUCING APPARATUS

[75] Inventor: Motohiko Hosaka, Kawasaki, Japan
[73] Assignee: Sony Corporation, Tokyo, Japan
[22] Filed: Nov. 1, 1974
[21] Appl. No.: 520,347

[30] Foreign Application Priority Data
    Nov. 8, 1973    Japan.............................. 48-12585

[52] U.S. Cl. .................... 360/137; 360/93; 360/96; 242/198
[51] Int. Cl.² ......................................... G11B 15/00
[58] Field of Search ......... 360/93, 96, 137; 242/198

[56]    References Cited
        UNITED STATES PATENTS
3,849,299   11/1974   Nakamichi............................ 360/96
        FOREIGN PATENTS OR APPLICATIONS
2,005,738   8/1971   Germany............................. 360/137

Primary Examiner—James W. Moffitt
Attorney, Agent, or Firm—Lewis H. Eslinger; Alvin Sinderbrand

[57]    ABSTRACT

In a cassette-type apparatus for recording and reproducing video signals on a magnetic tape, a cassette holding device is provided for receiving the cassette in an elevated, tilted position and then lowering to an operative position. During at least the final increment of movement of the cassette to its operative position, the cassette holding device maintains the cassette housing substantially in parallel orientation to the plane of the chassis, while moving the cassette in a direction substantially perpendicular to such plane for ensuring proper engagement with locating posts, reel support and drive members. The holder is mounted by a large first lever and a second short lever which are mounted between the sides of the holder and the chassis.

12 Claims, 6 Drawing Figures

CASSETTE HOLDING DEVICE FOR TAPE RECORDING AND/OR REPRODUCING APPARATUS

BACKGROUND OF THE INVENTION

1. Field of the Invention

This invention relates generally to cassette-type recording and/or reproducing apparatus, for example, for recording and reproducing video signals on a magnetic tape which is wound on and extends between supply and take-up reels rotatable within a cassette housing, and more particularly is directed to an improved cassette holding device for such apparatus.

2. Description of the Prior Art

In existing cassette-type video recording and/or reproducing apparatus, for example, as disclosed in U.S. Pat. No. 3,833,921, issued Sept. 3, 1974, and having a common assignee herewith, a tape loading and unloading device is provided with one or more tape engaging members which, with the cassette disposed in an operative position thereof, project upwardly through an opening in the cassette housing for engagement with a run of the tape extending between the reels within the tape housing, whereupon the tape loading and unloading device may be operated to withdraw tape from the cassette housing and to guide the withdrawn tape into engagement with a portion of the periphery of a guide drum for recording or reproducing of video signals on such tape by one or more rotary magnetic heads associated with the drum. Further, in the operative position of the cassette, the cassette housing is precisely located by locating posts extending from a chassis of the apparatus and being engageable from below with the cassette housing, and reel support and drive members extending rotatably above the chassis project upwardly into respective sockets provided in the supply and take-up reels of the operatively positioned cassette. For the sake of convenience, recording and/or reproducing apparatus of the described type usually further includes a cassette holding device having a cassette holder which is movably mounted in respect to the chassis so as to be displaceable between an elevated position in which the cassette can be conveniently received in, or discharged from the holder, and a lowered or operative position in which the cassette housing and reels are engaged by the locating posts and reel support and drive members, respectively, and the tape engaging members of the tape loading and unloading device extend upwardly into the opening of the cassette housing.

It will be apparent that, in order to ensure proper engagement of the locating posts with the underside of the cassette housing and of the reel support and drive members in the respective sockets of the supply and take-up reels, and further to ensure that the tape engaging members of the tape loading and unloading device properly enter the opening of the cassette housing, at least the final movement of the cassette toward its operative position should be substantially vertical, that is, substantial perpendicular to the plane of the chassis, with the cassette housing being maintained substantially horizontal, that is, in substantially parallel orientation in respect to the chassis plane, during such final movement to the operative position. If the cassette holder is merely pivotally mounted for swinging movement between its elevated or cassette receiving and discharging position and the operative or lowered position, the desired direction of the final movement of the cassette to its operative position and the desired orientation of the cassette housing during such final movement cannot be even approximately achieved unless the pivoting axis for the holder is offset a relatively large distance with respect to the holder, for example, as disclosed in U.S. Pat. No. 3,833,921. In that case, relatively long support arms extend from the opposite sides of the cassette holder to the pivoting axis and, in order to avoid interference with the tape loading and unloading device, the pivoting axis has to be disposed in front of the holder, that is, in the direction away from the tape loading device and the tape guide drum. With such positioning of the pivoting axis for the cassette holder, the latter, in its elevated position, is tilted downwardly at the front, and such tilted position is not conducive to the sliding of a cassette into and out of the cassette holder through an opening at the front of the latter.

In another existing recording and/or reproducing apparatus of the described type, the cassette holding device includes a cassette holder which is mounted for vertical movement between its elevated operative positions, with the holder being maintained substantially horizontal throughout such movement. Such mounting of the holder is effected by means of a lever assembly at each of its sides made up of a pair of criss-crossing levers of substantially equal length which are pivotally connected at their centers, and which have their upper and lower ends pivotally and slidably connected to the holder and to the chassis, respectively. Further, in such cassette holding device, vertical guide rails are provided at the opposite sides of the holder and engaged by followers on the latter for assuring the vertical movement of the holder while the cassette housing retained in the holder is held horizontally. The foregoing cassette holding device is relatively disadvantageous in that the described mechanisms for movably mounting the cassette holder in respect to the chassis are complex, and further in that the cassette holder, in its elevated position, is disposed horizontally and thus is not ideally disposed for slidably receiving or discharging a cassette through an opening at the front of the holder. In this connection, it should be noted that the ideal disposition of the cassette holder in its elevated position is one in which the cassette holder is tilted downwardly from an opening at the front thereof so that a cassette can be conveniently inserted or removed slidably through such opening at the front of the elevated cassette holder.

OBJECTS AND SUMMARY OF THE INVENTION

Accordingly, it is an object of this invention to provide an improved cassette holding device for a recording and/or reproducing apparatus of the described type, which cassette holding device is free of the above described disadvantages of the prior art.

More specifically, an object of this invention is to provide a cassette holding device as aforesaid, which, in its elevated position, is ideally disposed for conveniently receiving or discharging a cassette, and which, in moving to its lowered or operative position, disposes the cassette for proper engagement with the locating posts and reel support and drive members extending from the chassis and for the proper reception of the tape engaging members of a tape loading and unloading device.

Another object is to provide a cassette holding device, as aforesaid, which is relatively simple and compact so as to facilitate the production thereof, and further to permit its inclusion in a recording and/or reproducing apparatus without unduly enlarging the overall dimensions of the latter.

A further object is to provide a cassette holding device, as aforesaid, which is provided with a locking assembly which is effective to securely hold the cassette holder in its operative position, or elevated position.

In accordance with an aspect of this invention, a cassette holding device for a recording and/or reproducing apparatus of the described type comprises a cassette holder which is open at the front thereof, and which is movably mounted in respect to the chassis by means of mounting assemblies at the opposite sides of the holder, each of such mounting assemblies including a relatively long first lever pivotally connected, at its opposite ends, to the respective side of the holder and to the chassis, respectively, for swinging in a plane perpendicular to the plane of the chassis, with the first lever extending substantially parallel to the chassis plane in the operative position of the holder, and a relatively short second lever having three pivotal connections, at spaced apart locations therealong, connecting the second lever to the chassis, to the first lever and to the respective side of the holder, respectively, for effecting angular displacement of the second lever relative to the first lever in response to swinging of the latter and thereby being effective to establish the orientation of the holder relative to the plane of the chassis as the first lever swings relative to the chassis for moving the holder between its operative position in which the contained cassette housing is horizontal, and its elevated or cassette receiving and discharging position in which the holder tilts downwardly from its front opening.

The above and other objects, features and advantages of the invention, will be apparent in the following detailed description of an illustrative embodiment which is to be read in connection with the accompanying drawings.

DESCRIPTION OF A PREFERRED EMBODIMENT

Figure 6:
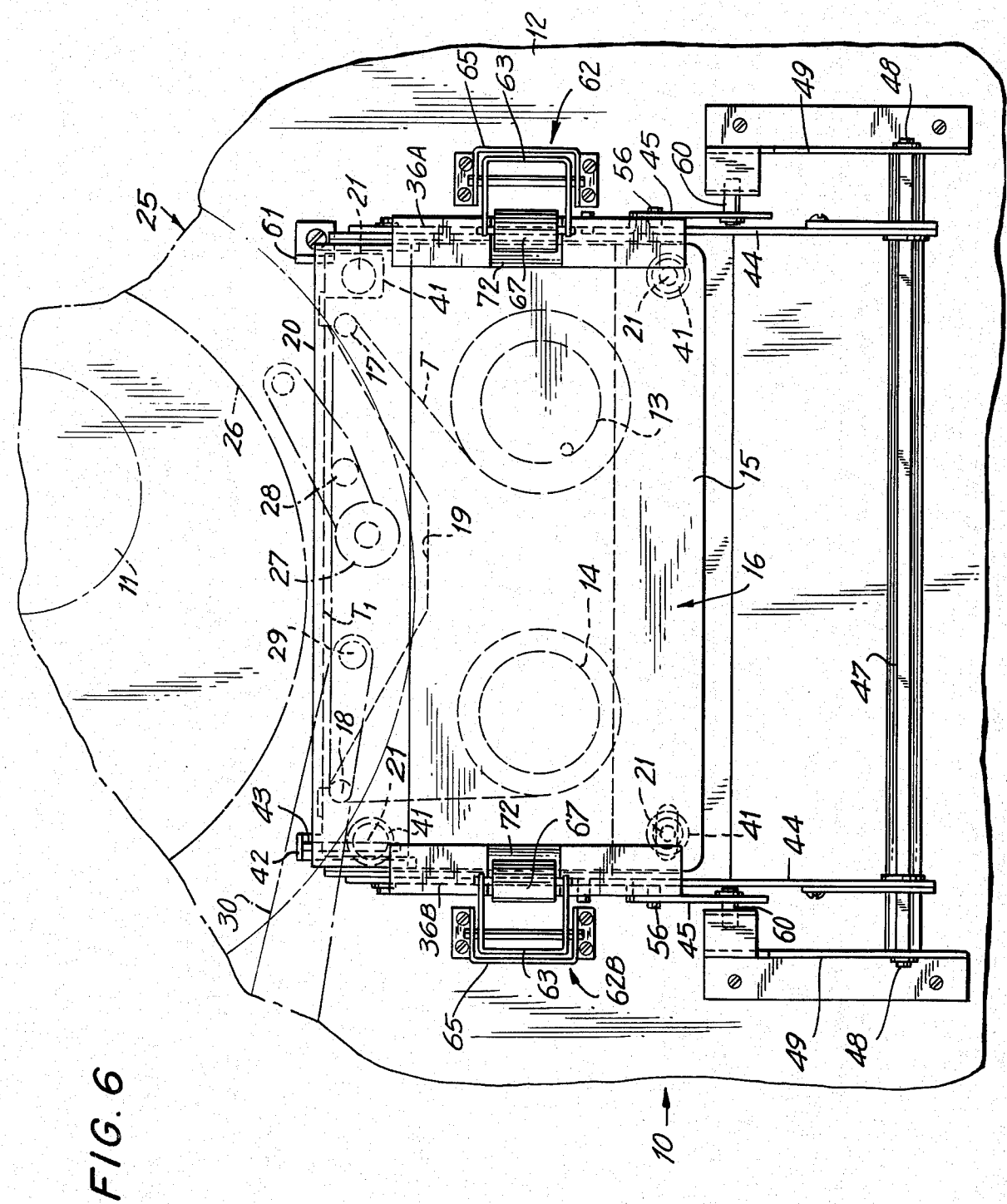
FIG. 6 is a top plan view of the cassette holding device shown in its operative position, as on FIGS. 3 and 5.

Referring to the drawings in detail, and initially to FIG. 6 thereof, it will be seen that a cassette holding device 10 according to this invention may be advantageously employed in a magnetic recording and/or reproducing apparatus of the type disclosed in detail in U.S. Pat. No. 3,833,921, and which is shown to generally comprise a cylindrical tape guide drum 11 mounted on a chassis 12 and containing rotary magnetic heads (not shown) which are moved along a circumferential slot or gap of the guide drum for recording or reproducing video signals in oblique tracks on a magnetic tape when the latter is moved longitudinally in a helical path extending around at least a portion of the periphery of guide drum 11.

Figure 1:
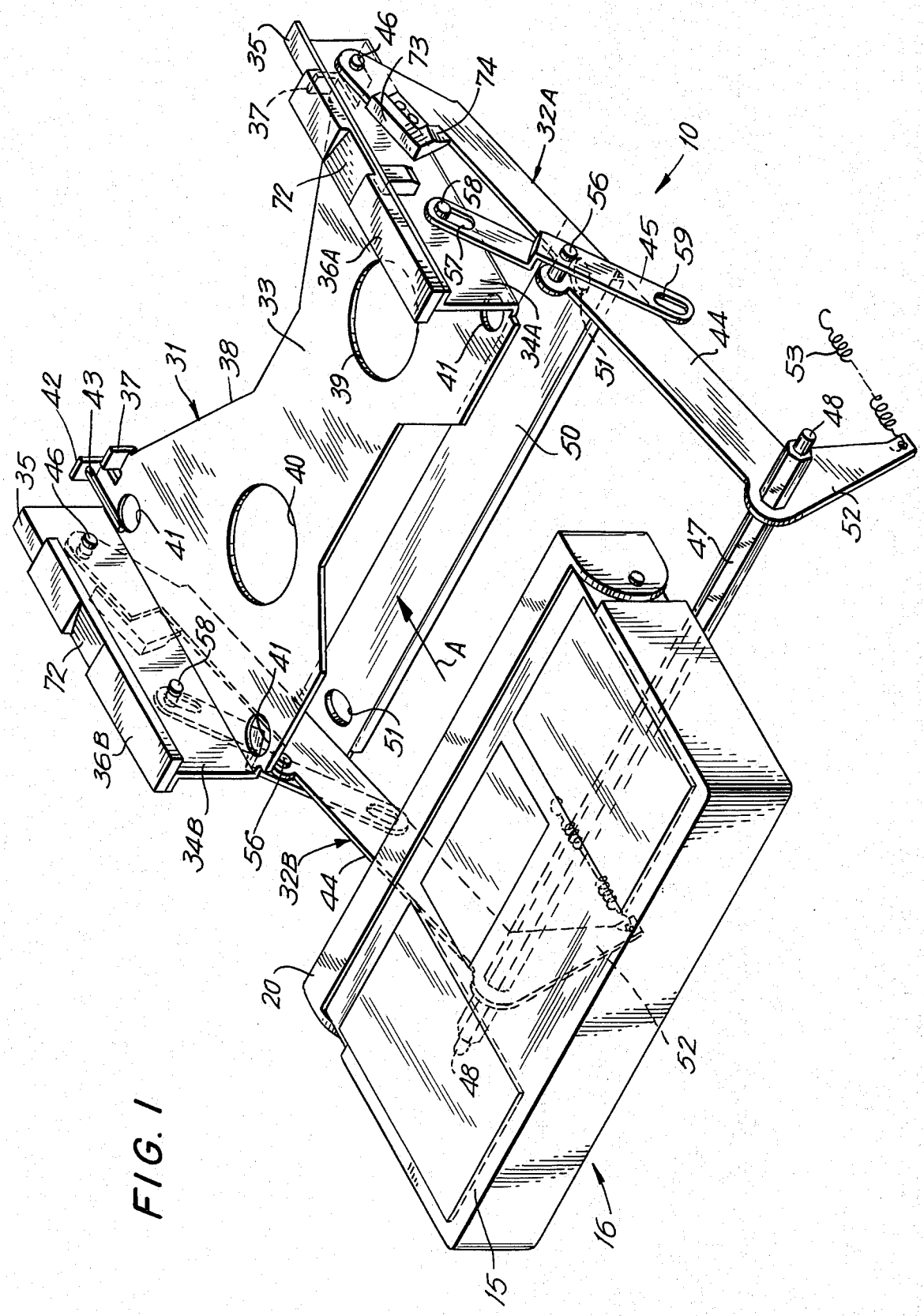
FIG. 1 is a perspective view of the main components of a cassette holding device according to an embodiment of this invention which is shown in its elevated position for receiving or discharging a cassette.

The magnetic tape T for such recording and reproducing of video signals is wound on supply and take-up reels 13 and 14 rotatably contained within a housing 15 of a conventional cassette 16 which further includes tape guides 17 and 18 by which the tape extending between reels 13 and 14 is normally directed in a run $T_1$ which extends across an opening 19 provided along the back of housing 15 and in the adjacent portion of the bottom of such housing. The cassette 16 is further shown to have a lid 20 pivoted on housing 15 for swinging relative to the latter between a closed position (FIG. 1) in which lid 20 substantially closes opening 19 for protecting the tape run $T_1$ extending thereacross, and an open position (FIGS. 3 and 6) in which the lid is swung upwardly to permit the tape in run $T_1$ to be withdrawn from housing 15 through the opening 19. The cassette 16 may be further provided with a latch mechanism (not shown) for normally securing lid 20 in its closed position, and which is adapted to be released when cassette 16 is in use for permitting the swinging of lid 20 to its open position.

The cassette holding device 10 according to this invention is disposed on chassis 12 in front of guide drum 11 and, as hereinafter described in detail, is adapted to receive cassette 16 at an elevated or cassette receiving and discharging position (FIGS. 2 and 4) and to carry the received cassette to a lowered or operative position (FIGS. 3,5 and 6) in preparation for a recording or reproducing operation of the associated apparatus. In such operative position of cassette 16, the housing 15 thereof is precisely located and maintained horizontally, that is, in parallel orientation to chassis 12, at a predetermined level by means of locating posts 21 which project upwardly from chassis 12 for engagement from below with the underside or bottom wall of housing 15 adjacent the four corners of the latter. At least one of the locating posts 21 has a pin 22 projecting therefrom (FIG. 2) for seating in a respective socket in the bottom of the cassette housing. Further, rotatable reel support and drive members 23 and 24 extend upwardly from chassis 12 and are located so that, when cassette 16 is in its operative position on locating posts 21, such reel support and drive members 23 and 24 will project upwardly through respective openings in the bottom of cassette housing 15 and seat axially in respective sockets provided in the hubs of supply and take-up reels 13 and 14 for rotatable coupling with the latter. Suitable drive assemblies (not shown) may be provided for driving take-up reel support and drive member 24 in the direction winding the tape T on take-up reel 14 during recording, reproducing and fast-forward operations of the associated apparatus, and for driving supply reel support and drive member 23 in the direction for rewinding the tape on supply reel 13 during rewinding operation of the apparatus.

The recording and/or reproducing apparatus associated with the cassette holding device 10 is further shown to comprise a tape loading and unloading device 25 which may be of the type disclosed in detail in U.S. Pat. No. 3,833,921, and which is shown in broken lines on FIGS. 2 and 6 to generally include a support ring 26 rotatable about guide drum 11 in a circular path that extends under the opening 19 of cassette housing 15 when the cassette is in its operative position. The device 25 is further shown to include tape engaging members, for example, a pinch roller 27 and a tape engaging pin 28 projecting upwardly from support ring 26 and a tape engaging pin 29 projecting upwardly from a horizontally swingable support arm 30. As shown, support ring 26 and arm 30 of tape loading and unloading device 25 are disposed, in a starting or inactive condition of device 25, so that pinch roller 27 and tape engaging pins 28 and 29 will extend upwardly into opening 19 of cassette housing 15 immediately in front of tape run $T_1$ when cassette 16 is in its operative position. Thereafter, with the latch mechanism of lid 20 released and with such lid moved to its open position, as hereinafter described, device 25 may perform a loading operation during which ring 26 is rotated and arm 30 is angularly displaced so that pinch roller 27 and tape engaging pins 28 and 29 are effective to engage tape run $T_1$ and to withdraw the tape from cassette housing 15 with the withdrawn tape being wrapped about at least a portion of the periphery of guide drum 11.

It will be apparent that, in order to permit the proper engagement of locating posts 21 with the bottom of cassette housing 15 and of reel support and drive members 23 and 24 in the sockets of supply and take-up reels 13 and 14, and further in order to ensure that tape engaging members 27–29 of the tape loading and unloading device 25 will properly enter cassette opening 19 in front of tape run $T_1$, at least the final movement of cassette 16 downwardly toward its operative position has to be effected in a substantially vertical direction, that is, perpendicular to the plane of chassis 12, with the cassette housing 15 being maintained substantially horizontal, that is, in parallel orientation to the plane of chassis 12, during such final movement.

The cassette holding device 10 according to this invention for achieving the above described final movement of the cassette 16 to its operative position from an elevated position is shown to generally comprise a cassette holder 31 and mounting assemblies 32A and 32B provided at the opposite sides of holder 31 and by which the latter is movably mounted on chassis 12. As shown particularly on FIG. 1, cassette holder 31 may include a table or base plate 33 having side walls 34A and 34B projecting upwardly along its opposite side margins. Flanges 35 may be directed outwardly from the upper edges of side walls 34A and 34B to provide seats for the secure attachment to holder 31 of bearing members 36A and 36B which extend along flanges 35 and are directed inwardly in respect to side walls 34A and 34B. Holder 31 is dimensioned so that cassette 16 may be slidably inserted rearwardly therein in the direction of the arrow A through the open front of holder 31 with side walls 34A and 34B engaging the respective sides of cassette housing 15 for laterally guiding the cassette, while bearing members 36A and 36B overhang the adjacent side portions of the cassette housing for holding the latter downwardly on base plate 33. Tabs 37 project upwardly from the back edge of base plate 33 adjacent side walls 34A and 34B so as to be engageable by the back edge of the bottom of housing 15 at opposite sides of the opening 19 for limiting the rearward sliding of the cassette into holder 31. The back edge portion of base plate 33 is cut out between tabs 37, as at 38, so as to expose the portion of opening 19 in the bottom of cassette housing 15 when the latter is fully inserted in holder 31. Further, base plate 33 is formed with laterally spaced apart, relatively large circular apertures 39 and 40 through which the reel support and drive members 23 and 24 may respectively extend into engagement with the supply and take-up reels 13 and 14. Base plate 33 is also shown to have openings 41 adjacent its corners and through which the locating posts 21 can extend for engagement with the bottom of cassette housing 15. In order to effect release of the previously mentioned latch mechanism of cassette 16 when the latter is slidably inserted into holder 31, the holder is provided with a tab 42 extending from the back edge of base plate 33 adjacent side wall 34B and carrying a forwardly directed pin 43 which is adapted to enter an aperture (not shown) in housing 15 for releasing the latch mechanism as the cassette nears its fully inserted position against tabs or stops 37. If desired, holder 31 may be further provided with a top wall (not shown) which spans the lateral space beteen bearing members 36A and 36B, and which may be manually pressed downwardly for effecting movement of holder 31 from its elevated cassette receiving and discharging position (FIGS. 2 and 4) to its lowered or operative position (FIGS. 3 and 5).

In accordance with the present invention, each of the mounting assemblies 32A and 32B is shown to include a main or first relatively long lever 44 and an auxiliary or second relatively short lever 45. The first relatively long lever 44 of each mounting assembly is pivotally connected, at one end, to a pivot pin 46 secured to the respective side wall 34A or 34B adjacent the back of holder 31. The opposite or forward end of each lever 44 is secured on an adjacent end portion of a horizontal axle 47 having journals 48 extending from its ends and being rotatably supported in laterally spaced apart brackets 49 secured on chassis 12 (FIGS. 2,3 and 6) at locations in front of the operative position of cassette 16. The first or main levers 44 of mounting assemblies 32A and 32B are preferably joined by a cross member 50 (FIG. 1) extending between their lower edges, and which may be formed integrally with such levers 44, as shown, so that levers 44 are swingable as a unit in respective vertical planes about a pivoting axis defined by axle 47. The cross member 50 may be formed with openings 51 adjacent the opposite ends thereof for registration with the adjacent openings 41 in base plate 33 of holder 31 when the latter is in its lowered or operative position. Each of levers 44 is further formed with a downwardly directed arm 52 extending from the forward end of such lever mounted on axle 47. Each arm 52 is connected to one end of a tension spring 53 which extends rearwardly and has its other end anchored to a flange 54 on the adjacent bracket 49. Thus, springs 53 urge levers 44 upwardly to the inclined positions shown on FIG. 2 corresponding to the elevated position of cassette holder 31 and at which arms 52 may engage stops 55 extending from adjacent brackets 49 for limiting the upward swinging of levers 44 (FIGS.

2 and 3).

The second or auxiliary lever 45 of each of the mounting assemblies 32A and 32B is pivotally mounted, intermediate its ends, on a pivot pin 56 which is fixedly carried by the respective main lever 44 at a location approximately midway between the ends of the latter. One end of each auxiliary lever 45 is pivotally and slidably connected to the adjacent side wall 34A or 34B of holder 31 at a location spaced forwardly along such side wall from the pivot pin 46. More specifically, in the illustrated embodiment, such pivotal and slidable connection is provided by an elongated slot 57 formed along one end portion of lever 45 and pivotally and slidably receiving a pivot pin 58 which is fixed to the adjacent side wall 34A or 34B at a location spaced forwardly from the respective pivot pin 46 and preferably at the same distance as the latter above the base plate 33. The opposite end portion of each lever 45, that is, the end portion thereof remote from the connection to the side wall 34A or 34B, is pivotally and slidably connected to the adjacent bracket 49 secured on chassis 12. More specifically, as shown, such pivotal and slidable connection of each lever 45 to the adjacent bracket 49 may be effected by an elongated slot 59 formed along the respective end portion of lever 45 and pivotally and slidably receiving a pivot pin 60 fixedly carried by the respective bracket 49 at a location spaced rearwardly from the journal 48, and preferably at the same level as the latter above the plane of chassis 12.

As shown particularly on FIG. 3, the pivoting axis of levers 44 in respect to chassis 12, that is, the axis defined by the journals 48 of axle 47 rotatable in brackets 49, is spaced upwardly from chassis 12 by a distance selected so that arms 44 extend horizontally, that is, a horizontal line extends between each journal 48 and the respective pivot 46 at the opposite end of each lever 44, when cassette holder 31 is in its lowered or operative position. Therefore, in the swinging of levers 44 from their inclined positions shown on FIG. 2 to their horizontal positions shown on FIG. 3, the arcuate path of travel of each pivot pin 46 becomes substantially vertical as holder 31 nears its operative position. Further, the curvature of the arcuate path of travel of each pivot pin 46 is minimized by the relatively great length of the respective lever 44. It will also be seen that each auxiliary lever 45 is preferably dimensioned and the respective pivot pins 56,58 and 60 are preferably located so that, in the operative position of holder 31 (FIG. 3), each auxiliary lever 45 also extends horizontally, that is, a line passing through the centers of the respective pivot pins 56,58 and 60 extends horizontally, that is, parallel to the plane of chassis 12. More particularly, in the case of the illustrated embodiment of the invention, pivot pins 56,58 and 60 associated with each auxiliary lever 45 are shown to be located so that, in the lowered or operative position of holder 31, the horizontal line passing through the centers of such pivot pins coincides with the horizontal line extending through the pivot pin 46 and journal 48 of the respective main lever 44 (FIG. 3).

Figure 2:
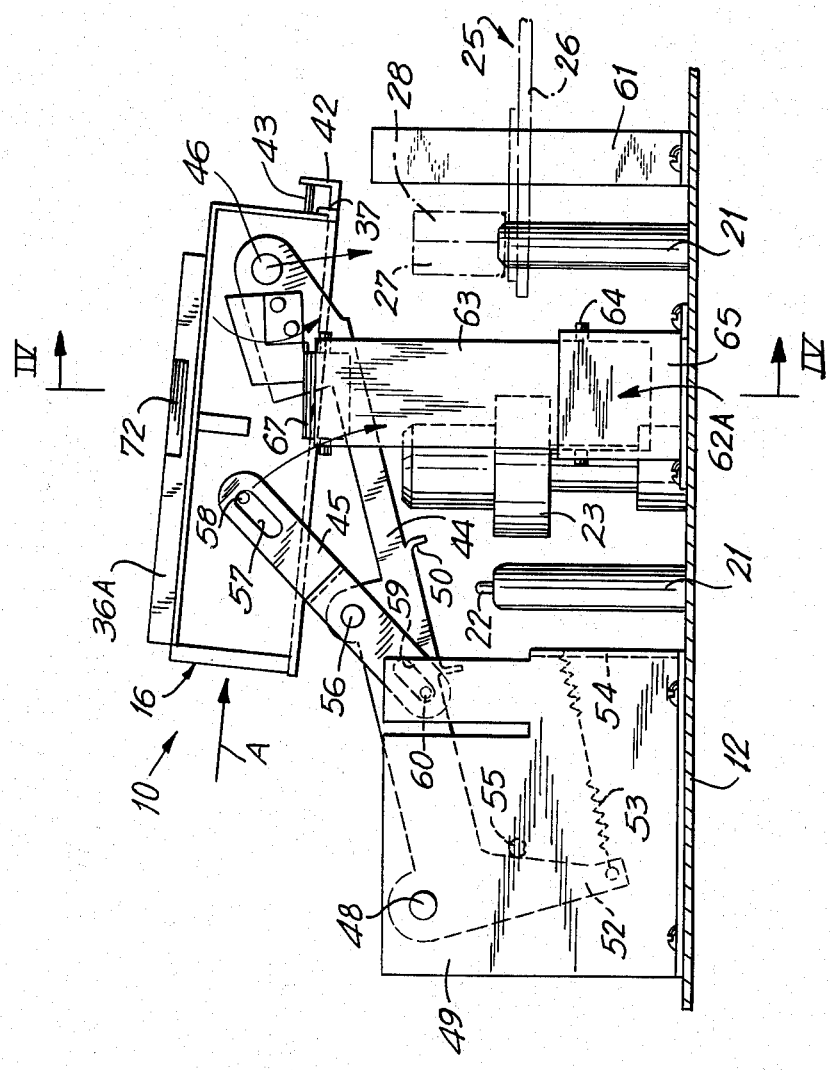
FIG. 2 is a side elevational view of the cassette holding device of FIG. 1, and which further shows such device associated with elements of a recording and/or reproducing apparatus, and also with a locking assembly provided on the chassis of the recording and/or reproducing apparatus.
Figure 3:
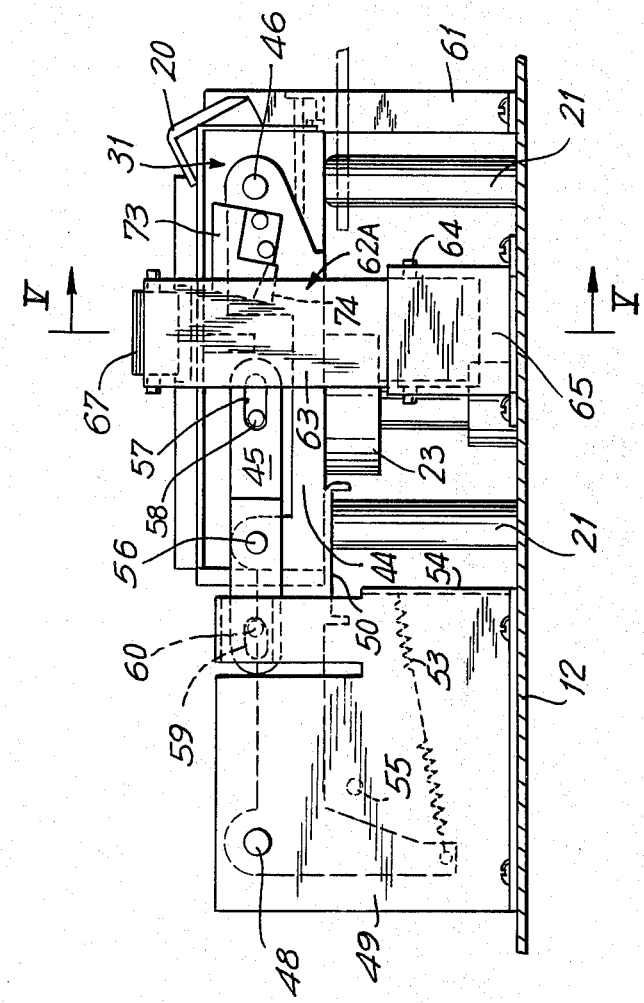
FIG. 3 is a side elevational view similar to that of FIG. 2, but showing the cassette holding device in its operative position.

Since the pivot pin 58 connecting each auxiliary lever 45 to the adjacent side wall 34A or 34B of holder 31 is disposed rearwardly in respect to the pivot pin 56 connecting such auxiliary lever 45 to the respective main lever 44, and since the pivot pin 60 connecting the auxiliary lever 45 to the respective bracket 49 is disposed forwardly in respect to the pivot pin 56, the upward swinging movement of each main lever 44, for example, from the horizontal position on FIG. 3 to the inclined position on FIG. 2, causes the respective auxiliary lever 45 to swing about its pivot pin 60 on bracket 49 in the same direction, that is, upwardly, but at a relatively greater rate of angular displacement than the lever 44. Preferably, the distances between each pivot 56 and pivots 58 and 60, respectively, are selected so that, in the upwardly inclined position of levers 44 shown on FIG. 2, and which correspond to the elevated cassette receiving and discharging position of the holder 31, the forward portion of holder 31 is held higher by levers 45 than the back portion of holder 31 supported by levers 44, that is, holder 31 will be tilted downwardly from the open front thereof (FIG. 2). By reason of such tilting of holder 31 in its elevated position, the slidable insertion and removal of cassette 16 through the open front of holder 31 is facilitated.

After a cassette 16 has been inserted in holder 31 with the latter in its elevated position, the latter may be manually pressed downwardly so as to swing the main levers 44 downwardly against the force of springs 53. During such downward swinging of main levers 44, the respective auxiliary levers 45 are pivoted downwardly about pivot pins 60, but at a greater angular rate than levers 44 so that, as main levers 44 near their horizontal positions shown on FIG. 3, auxiliary levers 45 approach their horizontal positions and holder 31 is disposed substantially, that is, in parallel orientation to the plane of chassis 12, for ensuring the proper engagement of the cassette 16 in holder 31 by the locating posts 21, reel support and drive members 23 and 24, and tape engaging members 27–29 of tape loading and unloading device 25.

As previously mentioned, during the insertion of cassette 16 into holder 31 at the elevated position of the latter, the pin 43 of the holder is effective to release a latch mechanism of cassette 16 so that, thereafter, during the downward movement of holder 31 to its operative position, a lid opening member 61 (FIGS. 2,3 and 6) extending upwardly from chassis 12 may act on the released lid 20 for swinging the latter to its open position (FIG. 3). Therefore, when holder 31 attains its lowered or operative position, the cassette 16 therein is conditioned for the previously described operation of tape loading and unloading device 25 in preparation for recording or reproducing operations of the associated apparatus.

In accordance with the present invention, the cassette holding device 10 is further provided with cassette locking assemblies 62A and 62B by which cassette holder 31 may be secured or locked in its lowered or operative position for preventing the removal of a cassette 16 therefrom, for example, so long as the support ring 26 of tape loading and unloading device 25 is displaced from its starting or inactive position, as is the case when tape has been withdrawn from the cassette.

In the illustrated embodiment of the invention, each of cassette locking assemblies 62A and 62B is shown to include a locking arm 63 which extends upwardly laterally outside a respective one of the mounting assemblies 32A and 32B, and which has its lower end portion pivoted on a pin 64 carried by a respective bracket 65 secured on chassis 12. Each locking arm 63 has a bifurcated, inwardly directed upper end portion 66 in which a roller 67 is rotatably supported. A connecting rod 68 extends laterally under holder 31 (FIGS. 4 and 5) and is pivotally connected at one end, as at 69, to locking arm 63 of assembly 62A below the pivot pin 64 of such locking arm, while the other end of rod 68 is pivotally connected, as at 70, to the locking arm 63 of assembly 62B at a location above the pivot pin 64 for the latter locking arm. By reason of the connecting rod 68, locking arms 63 of assemblies 62A and 62B are movable simultaneously between their outward or released positions, indicated in broken lines at 63' on FIG. 5, and their inward or locking positions, shown in full lines on FIG. 5. Locking arms 63 may be yieldably urged to their locking positions, for example, by a spring 71 acting on pin 69. Locking arms 63 are vertically dimensioned so that, when cassette holder 31 is pressed downwardly to its operative position, rollers 67 can roll inwardly onto inclined ramps 72 formed on bearing members 36A and 36B and, by reason of the force of spring 71, will exert downward pressures on such inclined ramps for retaining holder 31 in its operative or lowered position.

A suitable control mechanism (not shown) may be provided, for example, as disclosed in U.S. Pat. No. 3,833,921, to permit the initiation of a tape loading operation by device 25 only when cassette holder 31 is in its operative position and rollers 67 of locking assemblies 62A and 62B have moved to their locking positions on ramps 72, and further to prevent outward swinging of arms 63, whereby to secure rollers 67 in such locking positions for retaining holder 31 in its operative position and preventing removal of cassette 16 therefrom, so long as support ring 26 of the tape loading and unloading device 25 is displaced from its starting or inactive position. Such control mechanism for the locking assemblies 62A and 62B may further by selectively operative, for example, upon actuation of an ejecting mechanism (not shown) to move arms 63 outwardly to their released positions, that is, to move rollers 67 outwardly off bearing members 36A and 36B when the tape has been fully returned to the cassette 16 by a tape unloading operation of device 25 and it is desired to return holder 31 to its elevated position for removal of the cassette therefrom.

Figure 4:
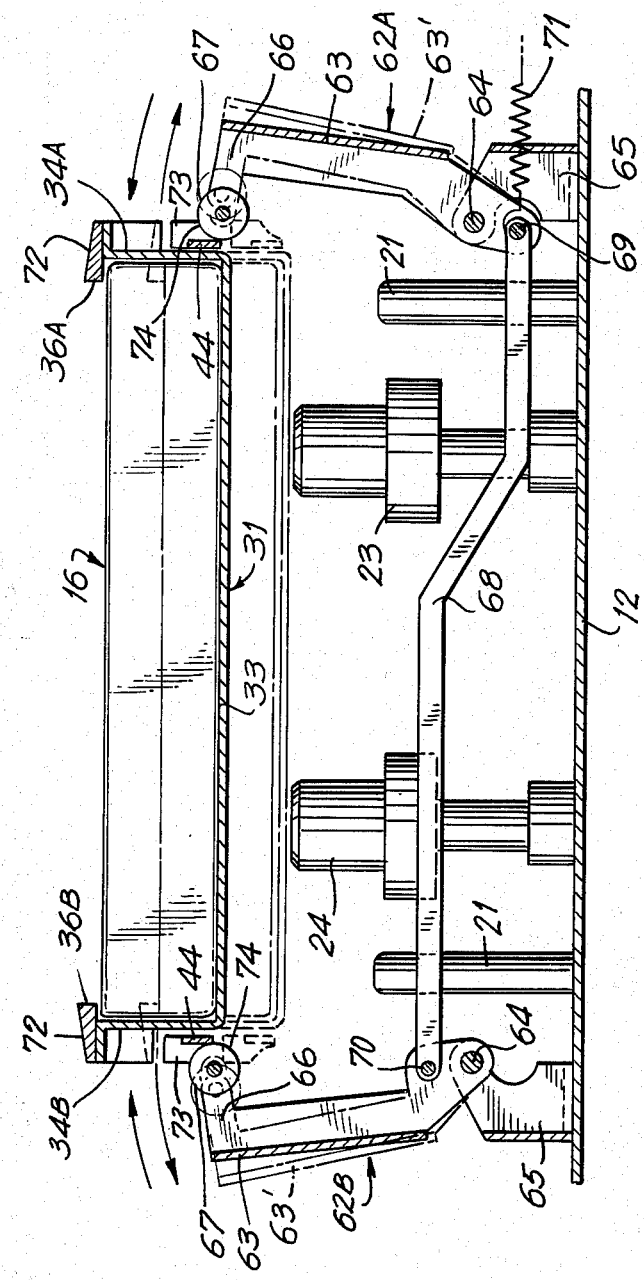
FIG. 4 is a transverse sectional view taken along the line IV—IV on FIG. 2.
Figure 5:
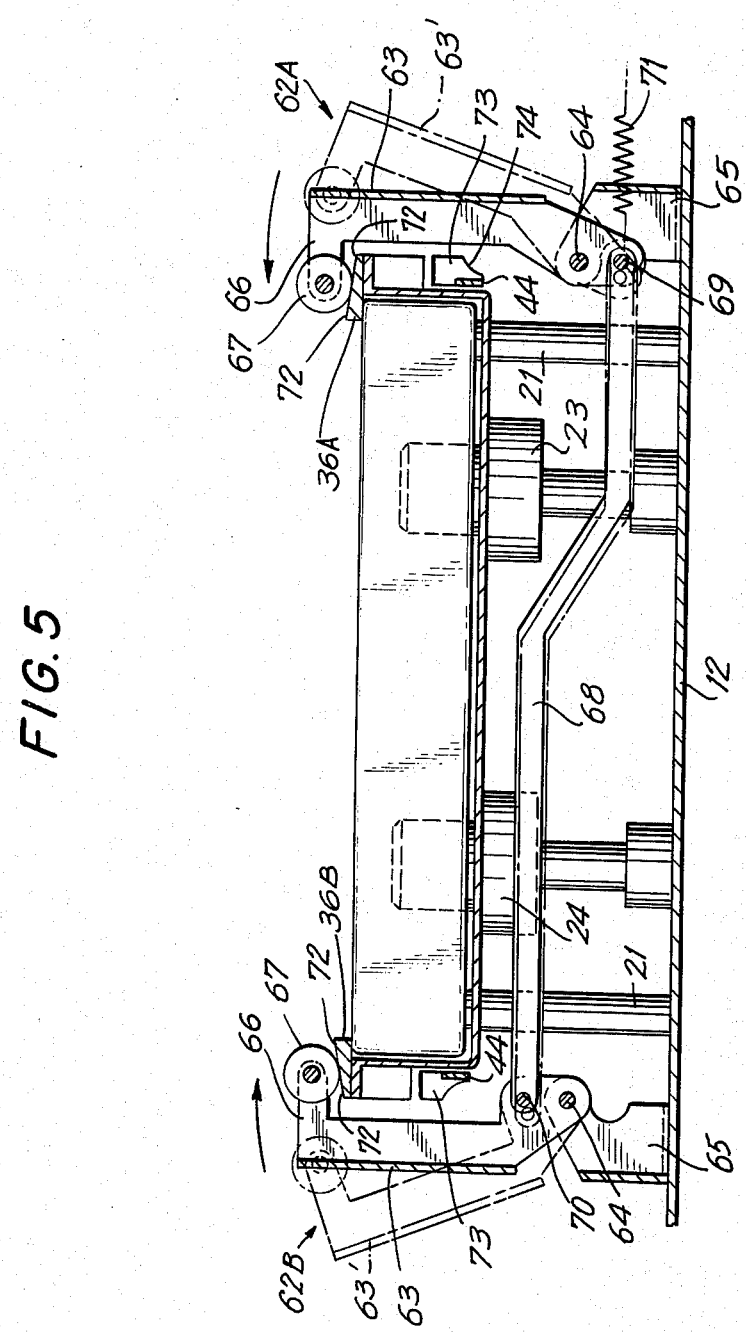
FIG. 5 is a sectional view similar to that of FIG. 4, but taken along the line V—V on FIG. 3.

Upon the return of holder 31 to its elevated position for receiving or discharging a cassette 16, arms 63 of locking assemblies 62A and 62B are again urged inwardly by spring 71 from their released positions indicated in broken lines at 63' on FIG. 4. However with holder 31 in its elevated position, bearing members 36A and 36B are above the level of rollers 67 and the upwardly inclined levers 44 of mounting assemblies 32A and 32B are raised to the level of rollers 67 so that the latter bear inwardly against levers 44 (FIGS. 2 and 4). Preferably, as shown, each lever 44 has a spacing member 73 secured thereon (FIGS. 1,2,4 and 5) to define a shoulder 74 which faces more or less in a downward direction, and which is located to be engaged by the respective roller 67 when holder 31 is in its elevated position. Thus, the force of spring 71 urging locking arms 63 inwardly, and hence pressing rollers 67 against the respective levers 44 and shoulders 74 serves to resist inadvertent downward movement of holder 31 from its elevated position. Accordingly, holder 31 is stabilized in its elevated position for receiving or discharging a cassette 16. However, after a cassette 16 has been inserted in holder 31, the forceful downward movement of holder 31, and the accompanying downward swinging of levers 44, causes rollers 67 to ride off shoulders 74 and over the outer surfaces of spacer members 73. As holder 31 nears its lowered or operative position, spacer members 73 come adjacent the outer edges of bearing members 36A and 36B so that rollers 67 can then roll smoothly off spacer members 73 and onto the respective ramps 72 of bearing members 36A and 36B for locking holder 31 in its lowered operative position, as described above.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. In a cassette-type recording and/or reproducing apparatus including a chassis, and cassette engaging members extending from said chassis and being engageable with a cassette for locating the latter in an operative position at which the apparatus can perform signal recording and reproducing operations on a magnetic tape wound on at least one reel rotatable in a housing of the cassette, and in which engagement and disengagement of said cassette engaging members with the cassette requires movement of the latter toward and away from said operative position with said cassette housing in substantially parallel orientation to the plane of said chassis: a cassette holding device comprising a cassette holder adapted to contain the cassette housing for movement of the latter with the holder relative to said chassis between said operative position and a cassette receiving and discharging position relatively remote from said chassis and at which a cassette in said holder is spaced from said cassette engaging members; and mounting assemblies at the opposite sides of said holder mounting the latter for said movement relative to said chassis, each of said mounting assemblies including relatively long first lever means pivotally connected, at one of its ends, to a first pivot point at the respective side of said holder and at the other of its ends to a second pivot point at said chassis, respectively, for swinging about said second pivot point in a plane perpendicular to said plane of the chassis, said first lever means extending substantially parallel to said plane of the chassis in said operative position of the holder and being inclined relative to said plane in said cassette receiving and discharging position so that said first lever means moves said holder relative to said chassis between said operative position and said cassette receiving and discharging position, and relatively short second lever means having three pivotal connections, at spaced apart locations therealong, connecting said second lever means to said chassis, said first lever means and said respective side of the holder, respectively, said second lever means being angularly displaced relative to said first lever means in response to said swinging of the first lever means, said pivotal connection of said second lever means to said respective side of the holder being spaced from said first pivot point so that said angular displacement of the second lever means causes said holder to pivot about said first point while said holder is moved by said first lever means as said first lever means swings relative to the chassis.

2. A cassette-type recording and/or reproducing apparatus according to claim 1; in which one of said three pivotal connections is fixed, and the other two of said three pivotal connections are slidable.

3. A cassette-type recording and/or reproducing apparatus according to claim 2; in which said pivotal connections of the second lever means to said chassis and to said respective side of the holder are respectively disposed adjacent the opposite ends of said second lever means and said pivotal connection of said second lever means to said first lever means is disposed intermediate said ends of the second lever means and intermediate said ends of the first lever means.

4. A cassette-type recording and/or reproducing apparatus according to claim 3; in which said pivotal connections of the second lever means to said chassis and to said respective side of the holder are constituted by elongated slots in the opposite end portions of said second lever means and by pivot pins slidable along said slots and being respectively fixed to said chassis and said respective side of the holder, and said pivotal connection of said second lever means to said first lever means defines a relative pivoting axis that is fixed in respect to said first and second lever means.

5. A cassette-type recording and/or reproducing apparatus according to claim 1; in which said three pivotal connections at spaced apart locations on the second lever means are arranged along a straight line which, in said operative position of the holder, is substantially parallel to said plane of the chassis.

6. A cassette-type recording and/or reproducing apparatus according to claim 5; in which, in said operative position of the holder, said three pivotal connections of the second lever means to said chassis, said first lever means and said respective side of the holder, respectively, are all located intermediate said first and second pivot points.

7. A cassette-type recording and/or reproducing apparatus according to claim 1; further comprising means joining together said first lever means of said mounting assemblies at the opposite sides of the holder for swinging of said first lever means of both said mounting assemblies as a unit.

8. A cassette-type recording and/or reproducing apparatus according to claim 1; in which said holder has an opening along a margin thereof extending between said sides of the holder for slidably receiving and discharging the cassette housing through said opening when said holder is in said cassette receiving and discharging position; and in which said second lever means of each of said mounting assemblies is dimensioned to tilt said holder, in said cassette receiving and discharging position, relative to said plane of the chassis in the direction which increases the distance therebetween toward said opening of the holder for facilitating the sliding of the cassette housing therethrough.

9. A cassette-type recording and/or reproducing apparatus according to claim 1; further comprising spring means for urging said holder to said cassette receiving and discharging position, and locking means for securing said holder in said operative position.

10. A cassette-type recording and/or reproducing apparatus according to claim 9; in which said locking means includes locking arms pivotally mounted on said chassis at said opposite sides of the holder for simultaneous movement between inner locking positions and outer released positions, bearing members on said holder facing away from said chassis at said opposite sides of the holder, rollers carried by said locking arms to engage on said bearing members at the adjacent sides of said holder when the latter is at said operative position and said locking arms are in said locking positions for securing said holder in said operative position.

11. A cassette-type recording and/or reproducing apparatus according to claim 10; in which spring means urge said locking arms toward said inner locking positions, said rollers ride against said first lever means of the adjacent mounting assemblies when said holder is in said cassette receiving and discharging position, and each said first lever means has shoulder defining means against which the adjacent one of said rollers is engageable for stabilizing said holder in said cassette receiving and discharging position.

12. A cassette-type recording and/or reproducing apparatus according to claim 1; in which said cassette engaging members include locating posts for precisely locating the cassette housing relative to said chassis in said operative position of the holder and a reel support and drive member for each said reel in the cassette, each said reel has a socket to axially receive the respective reel support and drive member, and said holder includes a base plate against which the cassette housing is disposed and having openings through which said locating posts can engage said cassette housing and said reel support and drive member can engage in the respective reel socket when said holder is moved to said operative position.

* * * * *